(12) United States Patent
Le Ravalec-Dupin et al.

(10) Patent No.: US 7,650,270 B2
(45) Date of Patent: Jan. 19, 2010

(54) METHOD AND SIMULATING BY FAST FOURIER TRANSFORMS FLOWS IN A HETEROGENEOUS POROUS MEDIUM

(75) Inventors: Mickaële Le Ravalec-Dupin, Rueil Malmaison (FR); Ludovic Ricard, Rueil-Malmaison (FR); Benoît Noetinger, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 810 days.

(21) Appl. No.: 11/127,090

(22) Filed: May 12, 2005

(65) Prior Publication Data

US 2005/0256688 A1    Nov. 17, 2005

(30) Foreign Application Priority Data

May 13, 2004   (FR)   .................................. 04 05212

(51) Int. Cl.
*G06F 7/48* (2006.01)
(52) U.S. Cl. .................. 703/10; 703/2; 702/12
(58) Field of Classification Search ........... 703/2, 703/9, 10; 702/6, 11–13; 166/252.2–252.4
See application file for complete search history.

(56) References Cited

U.S. PATENT DOCUMENTS 5,146,086 A * 9/1992 De et al. ............... 250/253

7,006,959 B1 * 2/2006 Huh et al. .............. 703/10

FOREIGN PATENT DOCUMENTS

| FR | 2 765 708 | 1/1999 |
| FR | 2 809 494 | 11/2001 |
| FR | 2 842 321 | 1/2004 |

* cited by examiner

*Primary Examiner*—Russell Frejd
(74) *Attorney, Agent, or Firm*—Antonelli, Terry, Stout & Kraus, LLP.

(57) ABSTRACT

The invention is a computer implemented method for fast simulation of the flow of a single and incompressible fluid in a heterogeneous porous medium such as an aquifer or a petroleum reservoir having application such as, for example, to the development of petroleum reservoirs. After discretizing the medium with a grid, a permeability field is determined from which a diffusivity equation is directly solved in the spectral domain by an iterative procedure involving fast Fourier transforms. A first algorithm directly manages the pressures and velocities, but it may be slow for great permeability contrasts. A second algorithm, which introduces an intermediate variable updated at each iteration, allows faster processing of greater permeability contrasts than the first algorithm. The third algorithm, based on increased Lagrangian, allows consideration of infinite permeability contrasts. The algorithms allow simulation of flows in weakly to highly heterogeneous media, with a reduced computing time.

20 Claims, 2 Drawing Sheets

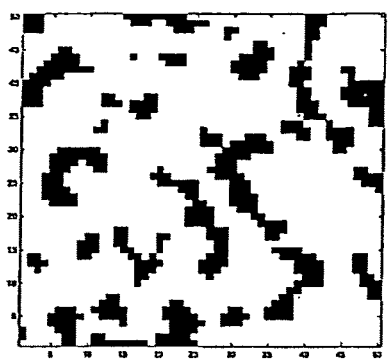
Figure 5.
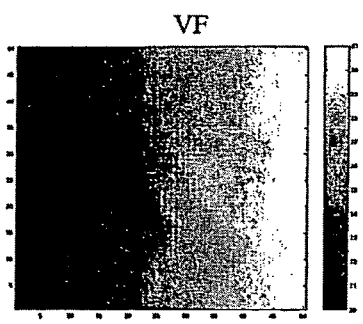 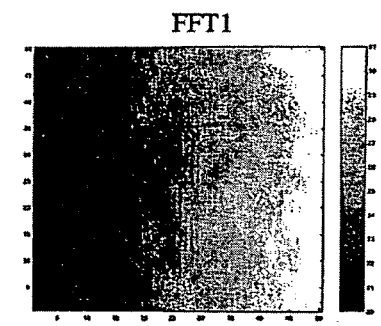 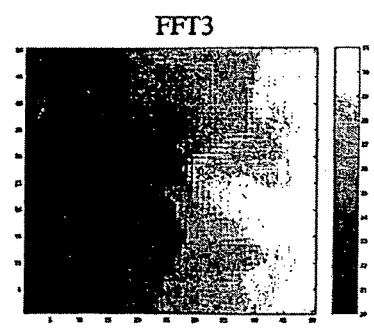
Figure 6A          Figure 6B          Figure 6C

METHOD AND SIMULATING BY FAST FOURIER TRANSFORMS FLOWS IN A HETEROGENEOUS POROUS MEDIUM

BACKGROUND OF THE INVENTION

1. Field of the Invention

The present invention relates to a method allowing fast simulation of flows in a heterogeneous porous medium such as a petroleum reservoir or an aquifer which is efficient for all types of permeability contrast.

2. Description of the Prior Art

One of the most important properties of the porous medium is its permeability K, defined by Darcy's law (1856). Because of the heterogeneity of the porous medium, permeability K is often considered as a random variable. In fact, the porous medium is represented by a permeability field that varies in space.

The flow of a single fluid with a steady-state flow in a porous medium is governed by Darcy's law:

$$U = -\frac{K}{\eta} grad(P) = -\frac{K}{\eta} \nabla P$$

where U is the filtration rate, K the permeability, P the pressure of the fluid and $\eta$ the viscosity of the fluid. The fluid is incompressible and the mass conservation equation is written as follows:

$$\text{div}(U) = 0$$

By combining the two equations above, the diffusivity equation is obtained as follows:

$$\text{div}\left(\frac{K}{\eta} \nabla P\right) = 0$$

Whatever the technique used to simulate flows in a heterogeneous porous medium, this diffusivity equation has to be solved. For a given permeability field discretized by a reservoir grid, the corresponding pressure and velocity fields have to be estimated.

The following documents, mentioned in the description hereafter, illustrate the state of the art:

Darcy, H., Les Fontaines Publiques de la Ville de Dijon, Victor Dalmont, Paris, France, 1856.

Eyre, D. J., and Milton, G. W., A Fast Numerical Scheme for Computing the Response of Composites Using Grid Refinement. *The European Physical Journal Applied Physics,* 6:41-47, 1999.

Michel J. C., Moulinec H., and Suquet P., A computational Method Based on Augmented Lagrangians and Fast Fourier Transforms for Composites with High Contrast, *Comput. Model. Eng. Sc.,* 1(2), 79-88, 2000.

Mizell S. A., Gutjahr A. L., and Gelhar L. W., Stochastic Analysis of Spatial Variability in Two-Dimensional Steady Groundwater Flow Assuming Stationary and Non-Stationary Heads, *Water Resources Research,* 18(4), 1053-1067, 1982.

Moulinec, H., and Suquet, P., A Numerical Method for Computing the Overall Response of Nonlinear Composites with Complex Microstructure. *Computer Methods in Applied Mechanics and Engineering,* 157:69-94, 1998.

Van Lent, T. J., Numerical Spectral Methods Applied to Flow in Highly Heterogeneous Aquifers, PhD thesis, Stanford University, 1992.

Many algorithms have been developed in the past to simulate flows in heterogeneous porous media. These algorithms essentially involve finite differences, finite volumes, hybrid mixed finite elements, conformal finite elements or spectral mixed finite elements. These techniques are very general and allow modelling of very complex flows. They are characterized in that they apply to transmissivities rather than permeabilities. To date, there is no simple and totally reliable method for estimating these transmissivities from the permeabilities.

In parallel with these various approaches, methods allowing working directly from the permeabilities have been developed. These methods favoring the use of Fourier transforms to simulate the flows were introduced by Van Lent (1992). Van Lent develops the diffusivity equation according to the small-perturbation method and proposes solving it in the frequency domain by means of an iterative approach. However, this method is suitable only for continuous and weakly heterogeneous porous media. It is not suited for simulation of the flows in a highly heterogeneous medium because of the approximations associated with the solution of the diffusivity equation developed according to the small-perturbation method. This method cannot, for example, apply to a medium containing two facies such as sandstones and clay, whose petrophysical properties are very different.

These techniques, which directly work from the permeabilities, that is without going through the transmissivities, are faster than the aforementioned complex methods, but they are limited to the description of a single-phase steady-state flow in a weakly heterogeneous porous medium. In fact, their use has remained very marginal.

SUMMARY OF THE INVENTION

The invention relates to a method of simulating, in a simple and fast way, the flow of a single and incompressible fluid in a heterogeneous porous medium such as an underground zone, whatever its degree of heterogeneity. The method comprises the following:

discretizing the heterogeneous medium by a grid;

determining a permeability field from measurements obtained by means of at least one of: logging measurements, seismic measurements and experimental measurements (on cores for example);

translating in the frequency domain the diffusivity equation which relates connecting permeability (K) to a pressure gradient ($\nabla P$) and to a filtration rate (U) and then developing this equation according to Neumann's formula; and determining at each cell of the grid, the pressure gradient ($\nabla P$) and the filtration rate (U), by an iterative solution of the developed diffusivity equation, by using fast Fourier transforms to accelerate the computations of iterative solution.

The method according to the invention allows fast simulation of the flow of a single and incompressible fluid in a porous medium whatever its heterogeneity. It is based on the development of the diffusivity equation in the spectral domain according to Neumann's formula. The method then allows solving this equation by an iterative model, by means of algorithms involving fast Fourier transforms. The proposed solutions allow fast computation of the pressure and velocity fields, and are an alternative to the simulators developed to date in the industry.

This method applies to petrophysical data such as acquired permeabilities, among other things, by means of logging, seismic and experimental (on cores for example) measurements. The method can be implemented for example in the area of petroleum production by reservoir engineers in order to rapidly obtain flow predictions in a weakly to highly heterogeneous medium, or even a discontinuous medium such as, for example, a fractured reservoir.

According to the invention, determining at each cell of the pressure gradient and of said filtration rate can be achieved directly from the value of the permeability field.

This determination at each cell of the pressure gradient and of the filtration rate can comprise the following:

defining, according to the degree of heterogeneity of the permeability field, an iteration variable according to at least one of the following petrophysical parameters: filtration rate (U) and pressure gradient ($\nabla P$);

determining the filtration rate (U) and the pressure gradient ($\nabla P$) by an iterative computation based on the iteration variable.

According to the invention, in the case of a weakly heterogeneous permeability field, the iterative variable can be filtration rate (U).

In the case of a very heterogeneous permeability field, the iterative variable can be a velocity ($\tau$), which is a function of at least one of the following parameters: mean permeability ($K^0$), permeability (K) and pressure gradient ($\nabla P$).

Finally, in the case of infinite permeability contrasts, for example in the case of a low-permeability matrix crossed by very permeable fractures, the iterative variable can be the Lagrangian multiplier $\lambda$.

BRIEF DESCRIPTION OF THE DRAWINGS

Other features and advantages of the method according to the invention will be clear from reading the description hereafter of a non limitative example, with reference to the accompanying figures wherein:

FIG. 5 shows an example of a facies permeability field (the permeability of the black facies is 20 mD and the permeability of the white facies is 500 mD); and FIGS. 6A, 6B and 6C show the pressure field corresponding to FIG. 5 calculated by finite volumes (VF), the corresponding pressure field calculated by fast Fourier transform (FFT1) and the corresponding pressure field calculated by Fourier transform based on increased Lagrangian (FFT3).

DETAILED DESCRIPTION OF THE INVENTION

Figure 1:
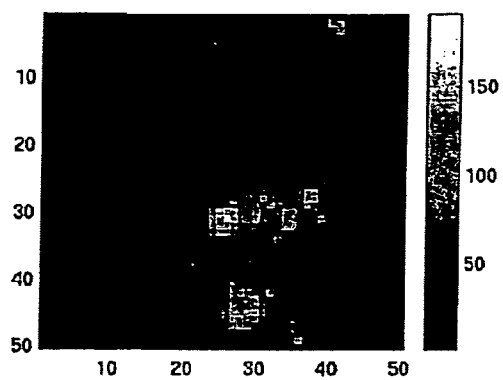
FIG. 1 shows an example of a continuous permeability field.

The simulation method according to the invention allows fast prediction of the flow of fluids in a heterogeneous medium. The various stages of the method are presented in the case where the medium is a petroleum reservoir, but the method can apply to any type of heterogeneous porous medium.

The objective is to provide the reservoir engineer with a tool allowing fast improvement in the description of the reservoir models and thus of the hydrocarbon production. A fast flow simulator is developed, limited to simple physics: the fluid is a single and incompressible fluid, and the flow is a steady-state flow. This simulator can apply to a heterogeneous permeable medium whatever its degree of heterogeneity.

1—Definition of the Problem

Modelling of flows in a petroleum reservoir is essentially based on the application, to the previously gridded reservoir, of the diffusivity law, a combination of Darcy's law and of the mass conservation equation for an incompressible fluid. In order to simplify the developments hereafter, it is assumed that the viscosity of the fluid is 1 and that the permeability corresponds to a scalar at each cell. These simplifications do not in any way detract from the generalization of the algorithms described hereafter. The equations are then written in the form as follows:

$$\begin{cases} U = -K\nabla P \\ div(U) = 0 \end{cases}$$

Pressure gradient $\nabla P$, filtration rate U and permeability K are considered as random variables.

The method is free from any reductive hypothesis concerning the degree of heterogeneity of the porous medium as a consequence of solving the diffusivity equation in the spectral domain modified according to Neumann's formula. Solution of this equation then allows defining, directly from the permeabilities defined at each cell of the reservoir grid, the pressure gradient and filtration rate values. This stage involves an iterative algorithm for accelerating the computations by using fast Fourier transforms to accelerate computations for the iterative solution as described in the following document:

Cooley, J W., and Tukey, J W., 1965, *"An Algorithm for the Machine Computation of Complex Fourier Series"*, Math. Comp., 19, 297-301.

In fact, the complexity of the fast Fourier transform algorithm is n log(n) instead of $n^2$ for a conventional Fourier transform algorithm, which allows considerable computing time to be saved.

The method can then be split up into 4 stages:

discretizing the reservoir by a grid;

determining a permeability field from measurements performed in wells (logging), seismic measurements and/or experimental measurements in the laboratory (on cores for example);

translating the diffusivity equation connecting the permeability to a pressure gradient and to a filtration rate, in the frequency domain and then modifying the diffusivity equation according to Neumann's formula;

determining, at each cell of the reservoir grid, the pressure gradient and the filtration rate, by an iterative solution of the equation thus translated. Three algorithms are used, each one comprising using fast Fourier transforms to accelerate the computations considerably.

The first two stages can be carried out by means of methods known in the art. A uniform Cartesian type grid can for example be used to discretize the reservoir. This type of grid is quite conventional for a reservoir engineer. The permeability field can, for example, be obtained from geostatistical estimations performed from the measurements achieved in wells by logging, from laboratory measurements allowing determination of the permeability of cores from the reservoir under study, and from seismic data to define, for example, the spatial variability of the permeability. Many techniques based on kriging estimations, known in the art, can be used. The way to obtain a grid of the reservoir with data provided by a permeability field is thus readily understandable to a reservoir engineer.

On the other hand, the diffusivity formula development stage and the fluid flow simulation stage are presented hereafter.

2—Diffusivity Equation Development

First an iterative formulation of the diffusivity equation is developed, allowing accounting for all types of heterogeneity, prior to solution of the algorithms.

Auxiliary Problem

A first focus is on an auxiliary problem which is the problem of the flow of a fluid in a homogeneous porous medium of permeability $K^0$ subjected to a velocity field $\tau$. The base equations thus become:

$$\begin{cases} U = -K^0 \nabla P + \tau \\ div(U) = 0 \end{cases}$$

which gives, in the frequency domain $$\begin{cases} \hat{U} = -iK^0 \xi \hat{P} + \hat{\tau} \\ i\xi \hat{U} = 0. \end{cases}$$

The symbol "1" indicates that the Fourier transform is considered, $\xi$ is the wave vector (discretization of the frequencies space) and i is such that: $i^2=-1$. By substituting $\hat{U}$ in the mass conservation equation, it is shown that:

$$\nabla \hat{P} = \frac{\xi \otimes \zeta}{\xi K^0 \xi} \hat{\tau}$$

This equation comes down to:

$$\nabla \hat{P} = \hat{\Gamma}^0 \hat{\tau} \text{ with } \hat{\Gamma}^0 = \frac{\xi \otimes \xi}{\xi K^0 \xi}$$

$\Gamma^0$ is referred to as "Green's operator" or "fundamental solution associated with $K^0$".

General Problem

Now the auxiliary problem is used to solve the problem of the flow of a fluid in a heterogeneous porous medium of permeability K and subjected to a pressure gradient $\nabla P$. The pressure gradient is the sum of two terms: a mean, referred to as macroscopic pressure gradient ($\nabla P^{macro}$) and a perturbation ($\nabla p$).

$$\begin{cases} U = -K\nabla P = -K(\nabla p + \nabla P^{macro}) \\ div(U) = 0 \end{cases}$$

For simplification reasons, it is assumed that gradient $\nabla P^{macro}$ is fixed. However, other conditions could be considered (Moulinec and Suquet, 1998). A reference field of homogeneous permeability $K^0$ is introduced:

$$U = -K\nabla P + K^0 \nabla P - K^0 \nabla P$$
$$= -(K - K^0)\nabla P - K^0 \nabla P$$
$$= \tau - K^0 \nabla P$$

The field $\tau$ is then defined by $\tau=(K^0-K)\nabla P$. With this formulation, Darcy's law and the mass conservation equation become:

$$U = -K^0(\nabla p + \nabla P^{macro}) + \tau$$

$$div(U) = 0$$

The solution determined for the auxiliary problem leads to the general solution as follows:

$$\nabla \hat{P}(\zeta) = \hat{\Gamma}^0 \hat{\tau} \quad \forall \zeta \neq 0$$

$$\nabla \hat{P}(0) = \nabla P^{macro}$$

which gives, in real space:

$$\nabla P = \Gamma^0 * \tau + \nabla P^{macro}.$$

Iterative Formulation

By taking account of the expression for $\tau$, $\nabla P$ is defined:

$$\nabla P = (K^0 - K)\Gamma^0 * \nabla P + \nabla P^{macro}.$$

It is finally shown that:

$$(I - (K^0 - K)\Gamma^0) * \nabla P = \nabla P^{macro}.$$

If now A is defined such that:

$$A = (K^0 - K)\Gamma^0.$$

the modification according to Neumann's formula leads to:

$$(I-A)^{-1} = I + A + A^2 + A^3 + \dots$$

The pressure gradient then becomes:

$$\nabla P = \sum_{j=0}^{n} ((K^0 - K)\Gamma^0)^j * \nabla P^{macro}.$$

To calculate this expression, the following is introduced:

$$\nabla P^j = \sum_{k=0}^{j} ((K^0 - K)\Gamma^0)^k * \nabla P^{macro}$$

which eventually provides the iterative formula as follows $$\nabla P^j = \nabla P^{macro} + (K^0 - K)\Gamma^0 * \nabla P^{j-1}.$$

By combining this expression with Darcy's law, it is shown that:

$$\nabla P^j = \nabla P^{macro} + \Gamma^0 * U^{j-1} + K^0 \Gamma^0 * \nabla P^{j-1}$$

3—Flow Simulation

The previous iterative formulation is the core of the three algorithms discussed hereafter. The iterative algorithms allow direct solution of this equation, that is to solve the diffusivity equation without any approximation concerning the type of heterogeneity.

First Algorithm

The first algorithm, which directly manages the pressures and velocities, is general.

1—Initialization

The initial value of the pressure gradient is given by the macroscopic pressure gradient: $\nabla P^0 = \nabla P^{macro}$. The initial rate is: $U^0 = -K \nabla P^{macro}$. $\nabla \hat{P}^0$ is calculated using a fast Fourier transform (FFT) algorithm.

2—Iteration j+1

$\nabla P^j$ and $U^j$ are known.

1) $\hat{U}^j$ is calculated using a FFT algorithm,
2) $\nabla \hat{P}^{j+1}(\xi) = {}^0(\xi)\hat{U}^j + K^0 \hat{\Gamma}^0(\xi) \cdot \nabla \hat{P}^j(\xi)$ when $\xi \neq 0$ and $\nabla \hat{P}^{j+1}(0) = \nabla P^{macro}$,
3) an inverse FFT algorithm is used to calculate $\nabla P^{j+1}$,
4) $[U^{j+1} = -K \nabla P^{j+1},]$ $U^{j+1}$ is calculated $K \nabla P^{j+1}$,
5) the effective permeability $$\left[ K_{eff}^{j+1} = -\frac{\langle U^{j+1} \rangle}{\langle \nabla P^{j+1} \rangle}, \right]$$

$K_{eff}^{j+1}$ is calculated 6) j=j+1 and back to stage 1 occurs until $$\| K_{eff}^{j+1} - K_{eff}^j \| \leq \varepsilon.$$

Calculations are very fast because fast Fourier transforms are used. However, this compels consideration of periodic boundary conditions and regular grids modelling the heterogeneous porous medium. The stopping criterion is based on the calculation of the effective permeability, but other criteria can be considered.

Selection of $K^0$ is crucial for the convergence. Empirically it is shown that value $$K^0 = \frac{\min(K) + \max(K)}{2}$$

is judicious.

The convergence rate is given (Eyre and Milton, 1999) by:

$$\| \nabla P^j - \nabla P^{j-1} \| = \gamma^j \| \nabla P^{macro} \| \quad \text{with: } \gamma = \frac{\frac{\max(K)}{\min(K)} + 1}{\frac{\max(K)}{\min(K)} - 1}.$$

Since $\gamma$ is less than 1, the algorithm that is developed converges for any initial value. However, the greater the permeability contrast, the slower the convergence. This is why a second algorithm is suggested.

Second Algorithm

The second algorithm, which introduces an intermediate variable updated at each iteration, allows on the one hand processing greater permeability contrasts than the first algorithm and, on the other hand, processing these significant permeability contrasts more rapidly.

To make the procedure faster, even in the case of permeability fields exhibiting significant permeability contrasts, Eyre and Milton's work (1999) was inspirational which was developed within the scope of dielectric permittivities. According to these authors, variable $\tau(x)$ can be written in a different form:

$$\tau = 2(I - \gamma z)^{-1} K^0 \nabla P^{macro}$$

with: I the identity $$\gamma = 2K^0 \Gamma^0 - I$$

$$z = \frac{K^0 + K}{K^0 - K}$$

Again, with reference to a Neumann's development, the following iterative formulation for $\tau$ is found:

$$\tau^{j+1} = 2K^0 \nabla P^{macro} + \tau^j \gamma z.$$

From this expression, the following algorithm is constructed:

1—Initialization

The initial value of the pressure gradient is given by the macroscopic pressure gradient: $\nabla P^0 = \nabla P^{macro}$. Then: $\tau^0 = 2K^0 \nabla P^{macro}$.

2—Iteration j+1

1) Calculate $Q^{j+1} = z\tau^j$,
2) Calculate $\hat{Q}^{j+1}$ using a FFT algorithm,
3) Calculate $\hat{\tau}^{j+1}(\xi) = \hat{\gamma}\hat{z}$, $\forall \xi \neq 0$ and $\hat{\tau}^{j+1}(0) = \hat{\tau}^0(0)$,
4) Calculate $\tau^{j+1}$ using an inverse FFT algorithm,
5) Set j=j+1 and go back to stage 1 until $\lambda \tau^{j+1} - \tau^j \| \leq \in$.

After convergence, estimate $\nabla P$ and $U$ from $\tau$ and from formula $\tau = (K^0 - K) \nabla P$.

Again, the convergence rate depends on $K^0$. According to Eyre and Milton (1999), the convergence is optimum when $K^0 = -\sqrt{\min(K)\max(K)}$ and the convergence rate is given by:

$$\| \nabla P^j - \nabla P^{j-1} \| = \gamma^j \| \nabla P^{macro} \| \quad \text{with: } \gamma = \frac{\sqrt{\frac{\max(K)}{\min(K)}} + 1}{\sqrt{\frac{\max(K)}{\min(K)}} - 1}.$$

Since $\gamma$ is less than 1, this algorithm converges whatever the starting point. It also converges more rapidly than the first algorithm as shown by the applications presented hereafter.

Third Algorithm

The previous methods allow fast solution of the diffusivity equation. It is shown that the rate of convergence of these algorithms is linked with the permeability contrast. These two algorithms allow addressing very significant but non infinite permeability contrasts. This type of medium can for example correspond to a low-permeability matrix crossed by very permeable fractures. In fact, fractured reservoirs constitute an extreme type of heterogeneous reservoirs comprising two contrasting media, a matrix medium containing the major part of the oil in place and of low permeability, and a fractured medium representing less than 1% of the oil in place and highly conducting. In the latter case of infinite contrasts, a new type of increased Lagrangian-based algorithm is considered, in parallel with the work by Michel et al. (2000).

The flow simulation problem now has to be considered as an energy minimization problem. This problem is conventionally tackled in three stages according to Uzawa's algorithm. First of all, the flow is solved globally. Then, a local energy dissipation equation is solved. Finally, the Lagrangian multiplier is updated. The flow simulation algorithm is as follows.

1—Initialization

The initial value of the pressure gradient is given by the macroscopic pressure gradient: $\nabla P^0 = \nabla P^{macro}$. The initial value of the Lagrangian multiplier is assumed to be equal to the opposite of the velocity: $\lambda^0 = K^0 \nabla p^0$. Variable $E_x$, whose initial value is the opposite of the macroscopic pressure gradient: $E_x^0 = -\nabla P^0$, is introduced.

2—Iteration j+1

$\nabla P^j$, $\lambda^j$, $E_x^j$ are known.

1) Calculate $\tau^{j+1} = \lambda^j + K^0 E_x^j$,
2) Calculate $\hat{\tau}^{j+1}$ using a FFT algorithm,
3) Calculate $$\hat{\nabla} P^{j+1}(\xi) = \begin{vmatrix} \hat{\Gamma}^0 \cdot \hat{\tau}^{j+1}(\xi) & \text{if } \xi \neq 0 \\ \hat{\nabla} P^0(0) & \text{otherwise,} \end{vmatrix}$$

4) Calculate $\nabla P^{j+1}$ using an inverse FFT algorithm,
5)

$$E_x^{j+1} = \nabla P^{j+1} - \frac{1}{K^0 + K}(\lambda^j + K \nabla P^{j+1})$$

is deduced therefrom,

6) $\lambda^{j+1} = \lambda^j - K^0(\nabla P - E_x^{j+1})$ is deduced therefrom,
7) Set j=j+1 and go back to stage 1 until $\|\lambda^{j+1} - \lambda^j\| \leq \in$,
8) after convergence, U is also estimated from $\nabla P$.

From some tests, it is shown that $K^0 = \sqrt{\min(K)\max(K)}$ is an optimum value.

4—Applications

To illustrate the potential of the foregoing algorithms, two-dimensional comparative tests are carried out.

A permeability is first considered which is field constructed on a two-dimensional 50×50-cell grid as shown in FIG. 1. The distribution of this permeability field is of log-normal type. The mean and the variance of the permeability logarithm are 1 and 3 respectively. The distribution of the permeability logarithm values follows an isotropic spherical variogram having a 20-cell range. For this permeability field, the flow problem described above is solved using, on the one hand, a conventional finite-difference solver and, on the other hand, the algorithms based on fast Fourier transforms disclosed herein.

Figures 2A, 2B, 2C:
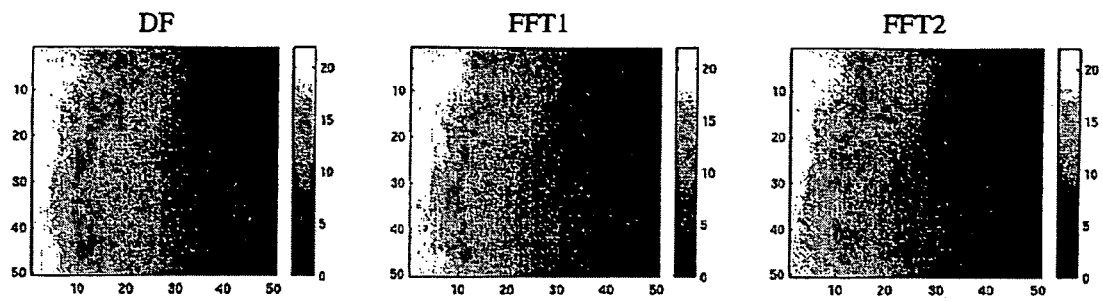
FIGS. 2A, 2B and 2C show the pressures calculated from a finite-difference solver (DF), the first algorithm (FFT1) and the second algorithm (FFT2)
Figures 3A, 3B, 3C:
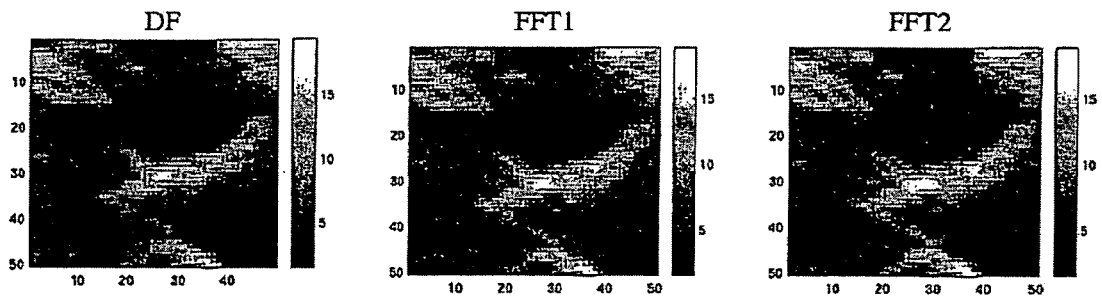
FIGS. 3A, 3B and 3C show the Darcy velocities along the X axis calculated from a finite-difference solver (DF), the first algorithm (FFT1) and the second algorithm proposed (FFT2)
Figures 4A, 4B, 4C:
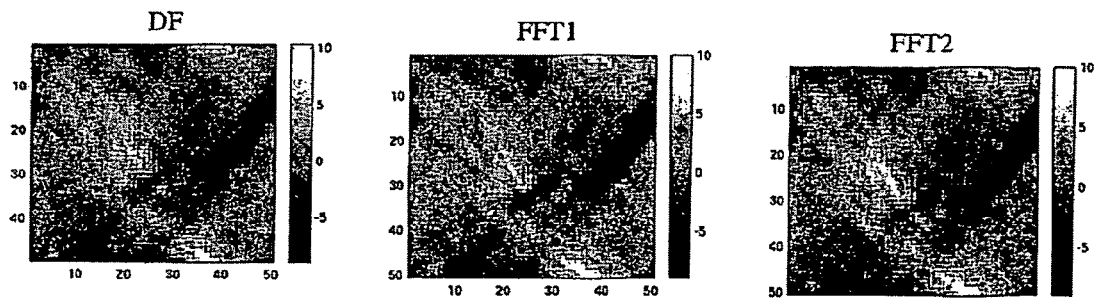
FIGS. 4A, 4B and 4C show the Darcy velocities along the Y axis calculated from a finite-difference solver (DF), the first algorithm (FFT1) and the second algorithm proposed (FFT2)

The pressure results are given in FIGS. 2A, 2B and 2C, the velocity results along horizontal axis X are given in FIGS. 3A, 3B and 3C, and the velocity results along vertical axis Y are given in FIGS. 4A, 4B and 4C. FIGS. 2A, 3A and 4A show the results obtained with a finite-difference type solver (DF). FIGS. 2B, 3B and 4B show the results obtained with the first algorithm (FFT1) and FIGS. 2C, 3C and 4C show the results obtained with the second algorithm (FFT2).

Clearly, the results are very similar. Slight differences can however be observed and explained, at least partly, by the very nature of the solution. For example, the finite-difference solution gives the velocities at the interfaces between the cells whereas the FFT-based algorithms disclosed herein gives the velocities at the center of the cells. There is thus a velocity shift. Besides, finite-difference solutions do not work directly with the permeabilities: they involve transmissivities. The transmissivity between two cells depends on the permeabilities of these two cells. To date, there is no universal technique for calculating these transmissivities. In general, they are estimated from the harmonic mean. This approach is justified with one dimension, but very improbable for greater dimensions. On the other hand, the algorithms disclosed herein use the permeabilities directly: they do not require transmissivities for which only approximate values are available.

A finer analysis is given in Table 1 where the first two fast Fourier transform algorithms are compared. The tests are carried out for the same permeability field, the field illustrated in FIG. 1, but with descending values for $\in$. It should be noted that $\in$ controls the algorithm stopping procedure. It can be observed that the second algorithm is markedly more efficient than the first one. For the same $\in$, the second algorithm requires less iterations. Furthermore, the effective permeability stabilizes more rapidly with the second algorithm than with the first one. For the case being studied, the effective permeability is 15.71. The first algorithm requires 290 iterations for this value to be reached, whereas the second one only requires 21 iterations.

TABLE 1

Comparison between the first two disclosed algorithms proposed. $\epsilon$ is a constant that determines stoppage of the iterative procedure. $K_{eff}$ is the effective permeability at the last iteration.

| | 1st algorithm | | 2nd algorithm | |
|---|---|---|---|---|
| $\epsilon$ | Number of iterations | $K_{eff}$ | Number of iterations | $K_{eff}$ |
| $10^{-2}$ | 27 | 15.83 | 21 | 15.71 |
| $10^{-3}$ | 58 | 15.74 | 31 | 15.71 |
| $10^{-4}$ | 102 | 15.72 | 41 | 15.71 |
| $10^{-5}$ | 158 | 15.72 | 49 | 15.71 |
| $10^{-6}$ | 290 | 15.71 | 59 | 15.71 |

A second example is given by a facies reservoir illustrated in FIG. 5. The medium has 2 facies. The dominant facies, present at 70%, has a 500 mD permeability: it is the reservoir facies (white in FIG. 5). The non-reservoir facies (black in FIG. 5), present at 30%, has a 20 mD permeability. In this case, only the FFT algorithm based on increased Lagrangian (FFT3 in FIG. 6C) converges. It leads to a solution (FIG. 6C) that is quite similar to the solution determined by finite volumes (VF in FIG. 6A) even though, as mentioned above, differences remain. These differences can here again be linked with the way the permeabilities are considered. In the case of finite volumes, transmissivities calculated like the harmonic mean of the permeabilities of adjacent cells are used. One thus tends to smooth the permeability discontinuities. The FFT algorithms (FFT1 in FIG. 6B) directly consider the permeabilities and are therefore probably more sensitive to the permeability discontinuities. It can also be observed that, in the case of the first FFT algorithm, even if there is no convergence, the first iteration is sufficient to approximate to the pressure field quite well.

The invention claimed is:

1. A method of simulating flow of a single and incompressible fluid in a heterogeneous porous medium using a flow simulator, comprising:

discretizing the heterogeneous porous medium by a grid containing cells;

determining at each cell of the grid a permeability field from measurements obtained by at least one of logging measurements, seismic measurements and experimental measurements;

developing a flow simulator which is implemented by a computer wherein a diffusivity equation is translated in a frequency domain, the diffusivity equation relating permeability of the heterogeneous porous medium to a pressure gradient and to a filtration rate of the heterogeneous porous medium wherein the diffusivity equation is modified according to Neumann's formula and wherein the modified diffusivity equation is solved by an iterative solution using fast Fourier transforms to accelerate computation of the iterative solution; and using the flow simulator to determine at each cell of the grid a pressure gradient and a filtration rate from the permeability values determined from the measurements.

2. A method as claimed in claim 1, wherein determination at the cells of the pressure gradient and of the filtration rate is achieved directly from a value of the permeability field.

3. A method as claimed in claim 2, wherein determination at the cells of the pressure gradient and of the filtration rate comprises:

defining, according to a degree of heterogeneity of the permeability field, an iteration variable according to at least one of the filtration rate and the pressure gradient; and determining the filtration rate and the pressure gradient by an iterative computation based on an iteration variable.

4. A method as claimed in claim 3, wherein the iteration variable is the filtration rate.

5. A method as claimed in claim 3 wherein the heterogeneous porous medium is an underground zone.

6. A method as claimed in claim 4 wherein the heterogeneous porous medium is an underground zone.

7. A method as claimed in claim 3 comprising:
using the determined pressure gradient and filtration rate of the cells to develop the heterogeneous porous medium.

8. A method as claimed in claim 2 wherein the heterogeneous porous medium is an underground zone.

9. A method as claimed in claim 2 comprising:
using the determined pressure gradient and filtration rate of the cells to develop the heterogeneous porous medium.

10. A method as claimed in claim 1, wherein determination at the cells of the pressure gradient and of the filtration rate comprises:

defining, according to a degree of heterogeneity of the permeability field, an iteration variable according to at least one of the filtration rate and the pressure gradient; and determining the filtration rate and the pressure gradient by an iterative computation based on an iteration variable.

11. A method as claimed in claim 10, wherein the iteration variable is the filtration rate.

12. A method as claimed in claim 11 wherein the heterogeneous porous medium is an underground zone.

13. A method as claimed in claim 10, wherein the iteration variable is a velocity function of at least one of mean permeability, the permeability of the heterogeneous porous medium and the pressure gradient.

14. A method as claimed in claim 13 wherein the heterogeneous porous medium is an underground zone.

15. A method as claimed in claim 10, wherein the iterative variable is a Lagrange multiplier $\lambda$.

16. A method as claimed in claim 15 wherein the heterogeneous porous medium is an underground zone.

17. A method as claimed in claim 10 wherein the heterogeneous porous medium is an underground zone.

18. A method as claimed in claim 10 comprising:
using the determined pressure gradient and filtration rate of the cells to develop the heterogeneous porous medium.

19. A method as claimed in claim 1 wherein the heterogeneous porous medium is an underground zone.

20. A method as claimed in claim 1 comprising:
using the determined pressure gradient and filtration rate of the cells to develop the heterogeneous porous medium.

* * * * *